(12) United States Patent
Yu

(10) Patent No.: US 8,690,355 B2
(45) Date of Patent: Apr. 8, 2014

(54) PROJECTING APPARATUS AND PROJECTING EQUIPMENT HAVING A SWITCHING CONTROL VALVE SWITCHED BETWEEN ON AND OFF POSITIONS

(75) Inventor: Gang Yu, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 169 days.

(21) Appl. No.: 13/318,355

(22) PCT Filed: Jul. 27, 2011

(86) PCT No.: PCT/CN2011/077647
§ 371 (c)(1),
(2), (4) Date: Oct. 31, 2011

(87) PCT Pub. No.: WO2013/007035
PCT Pub. Date: Jan. 17, 2013

(65) Prior Publication Data
US 2013/0016325 A1    Jan. 17, 2013

(30) Foreign Application Priority Data
Jul. 11, 2011    (CN) .......................... 2011 1 0193200

(51) Int. Cl.
*G03B 21/20* (2006.01)
(52) U.S. Cl.
USPC .................. 353/85; 353/30; 353/84; 353/88; 353/94; 353/99; 362/245; 362/247
(58) Field of Classification Search
USPC .................. 353/30, 31, 34, 82, 84, 85, 88, 94, 353/98–99; 362/227, 231, 245, 247, 327, 362/333, 551, 800; 349/5, 7–9
See application file for complete search history.

(56) References Cited

U.S. PATENT DOCUMENTS

| | | | |
|---|---|---|---|
| 7,344,279 B2 * | 3/2008 | Mueller et al. | 362/294 |
| 7,628,510 B2 * | 12/2009 | Chen et al. | 362/241 |
| 7,784,950 B2 * | 8/2010 | Sawai | 353/97 |
| 7,857,458 B2 * | 12/2010 | Fujita et al. | 353/46 |
| 2004/0160758 A1 | 8/2004 | Chang | |
| 2007/0121310 A1 | 5/2007 | Sakata et al. | |
| 2007/0223244 A1 * | 9/2007 | Kurihara et al. | 362/551 |
| 2008/0025043 A1 | 1/2008 | Lee | |
| 2010/0259726 A1 * | 10/2010 | Nakamura | 353/20 |

FOREIGN PATENT DOCUMENTS

| | | |
|---|---|---|
| CN | 1487356 A | 4/2004 |
| CN | 101114080 A | 1/2008 |
| JP | 2010276757 A | 12/2010 |

* cited by examiner

*Primary Examiner* — Sultan Chowdhury

(57) ABSTRACT

The present invention discloses a projecting apparatus. The apparatus includes light emitting diodes, a light guide plate and a projecting component. The light guide plate is mounted between the light emitting diodes and the projecting component. A switching control valve is mounted between the light guide plate and the projecting component. The switching control valve is switched between an on position and an off position between the light guide plate and the projecting component. In the on position, the switching control valve guides lights of the light guide plate to the projecting component as a light source of the projecting component; in the off position, the switching control valve cuts off the lights guided from the light guide plate to the projecting component to further cut off the light source of the light guide plate. The present invention further discloses a projecting equipment.

6 Claims, 2 Drawing Sheets

(Using best-effort extraction)

PROJECTING APPARATUS AND PROJECTING EQUIPMENT HAVING A SWITCHING CONTROL VALVE SWITCHED BETWEEN ON AND OFF POSITIONS

FIELD OF THE INVENTION

The present invention relates to a field of projection technology, and more particularly to a projecting apparatus and projecting equipment.

BACKGROUND OF THE INVENTION

With projectors being continuously popularized, users have more requirements for functions of the projectors.

Projector equipments in the conventional technology basically use a computer to connect a projector, and use signals from the computer to control operations, such as the on/off action of the projector. Because of the requirement of being connected to the computer, therefore it is inconvenient in the practical operation process and has higher cost.

It is one of the technical problems to be solved in the field of projection technology on how to overcome the problem of requiring a computer to control a projector, which leads to complicated operation and high cost in the conventional technology

SUMMARY OF THE INVENTION

A first object of the invention is to provide a projecting apparatus to solve the problem of requiring a computer to control a projector, which leads to complicated operation and high cost in the conventional technology.

In order to solve the foregoing problem, the present invention constructs a projecting apparatus, and the apparatus has light emitting diodes, a light guide plate and a projecting component, wherein the light guide plate is mounted between the light emitting diodes and the projecting component, and a switching control valve is mounted between the light guide plate and the projecting component, and an axis is mounted between the light guide plate and the projecting component, and the switching control valve is rotationally connected to the axis and switched between an on position and an off position between the light guide plate and the projecting component via the axis;

when the switching control valve is in the on position, lights of the light guide plate is guided into the projecting component as a light source of the projecting component;

when in the off position, the switching control valve cuts off the lights guided from the light guide plate to the projecting component, ant thereby cuts off the light source of the projecting component;

the switching control valve has a reflection layer mounted on a side thereof to which the light guide plate is connected, and while the switching control valve is switched to the off position, the reflection layer reflects the lights of the light guide plate back to the light guide plate.

In the projecting apparatus of the present invention, a length direction of the light guide plate and a projection direction of the projecting component are parallel.

A second object of the invention is to provide a projecting apparatus to solve the problem of requiring a computer to control a projector, which leads to complicated operation and high cost in the conventional technology.

In order to solve the foregoing problem, the present invention constructs a projecting apparatus, and the apparatus has light emitting diodes, a light guide plate and a projecting component, wherein the light guide plate is mounted between the light emitting diodes and the projecting component;

a switching control valve is mounted between the light guide plate and the projecting component, and the switching control valve is switched between an on position and an off position between the light guide plate and the projecting component;

wherein when the switching control valve is in the on position, lights of the light guide plate is guided to the projecting component as a light source of the projecting component;

when in the off position, the switching control valve cuts off the lights guided from the light guide plate to the projecting component, ant thereby cuts off the light source of the projecting component.

In the projecting apparatus of the present invention, the switching control valve has a reflection layer mounted on a side thereof to which the light guide plate is connected; and while the switching control valve is switched to the off position, the reflection layer reflects the lights of the light guide plate back to the light guide plate.

In the projecting apparatus of the present invention, a length direction of the light guide plate and a projection direction of the projecting component are parallel.

In the projecting apparatus of the present invention, an axis is mounted between the light guide plate and the projecting component, and the switching control valve is rotationally connected to the axis and switched between the on position and the off position between the light guide plate and the projecting component.

A third object of the invention is to provide a projecting apparatus to solve the problem of requiring a computer to control a projector, which leads to complicated operation and high cost in the conventional technology.

In order to solve the foregoing problem, the present invention constructs a projecting apparatus, and the apparatus has light emitting diodes and a projecting component, and the apparatus further comprises a switching control valve and a light guide plate;

wherein along a length direction of the light guide plate, the light guide plate has a side connected to the light emitting diodes, and has another side cut into bevel-shaped; the bevel-shaped side has a first reflection layer mounted thereon; the projecting component corresponds to the first reflection layer; a projection direction of the projecting component is perpendicular to the length direction of the light guide plate; the switching control valve is switched between an on position and an off position between the light guide plate and the projecting component;

wherein when the switching control valve is in the on position, the first projection layer reflects lights of the light guide plate into the projecting component as a light source of the projecting component;

when in the off position, the switching control valve cuts off the lights reflected from the first reflection layer to the projecting component, and thereby cuts off the light source of the projecting component.

In the projecting apparatus of the present invention, the light guide plate further has a shorter side adjacent to the bevel-shaped side; the shorter side is perpendicular to the length direction of the light guide plate;

Wherein the shorter side has a second reflection layer mounted thereon, and the second reflection layer reflects the lights from the light guide plate back to the light guide plate.

In the projecting apparatus of the present invention, an axis is mounted between light guide plate and the projecting component; the switching control valve is rotationally to the axis and switched between an on position and an off position between the light guide plate and the projecting component via the axis.

A fourth object of the invention is to provide a projecting equipment to solve the problem of requiring a computer to control a projector, which leads to complicated operation and high cost in the conventional technology.

In order to solve the foregoing problem, the present invention constructs a projecting equipment, and the projecting equipment has a projecting apparatus, and the apparatus has light emitting diodes, a light guide plate and a projecting component, and the light guide plate is mounted between the light emitting diodes and the projecting component;

a switching control valve is mounted between the light guide plate and the projecting component, and the switching control valve is switched between an on position and an off position between the light guide plate and the projecting component;

wherein when the switching control valve is in the on position, lights of the light guide plate is guided to the projecting component as a light source of the projecting component;

when in the off position, the switching control valve cuts off the lights guided from the light guide plate to the projecting component, ant thereby cuts off the light source of the projecting component.

In the projecting equipment of the present invention, the switching control valve has a reflection layer mounted on a side thereof to which the light guide plate is connected; and while the switching control valve is switched to the off position, the reflection layer reflects the lights of the light guide plate back to the light guide plate.

In the projecting equipment of the present invention, an axis is mounted between the light guide plate and the projecting component, and the switching control valve is rotationally connected to the axis and switched between the on position and the off position between the light guide plate and the projecting component.

In the projecting equipment of the present invention, a length direction of the light guide plate and a projection direction of the projecting component are parallel.

A fifth object of the invention is to provide a projecting equipment to solve the problem of requiring a computer to control a projector, which leads to complicated operation and high cost in the conventional technology.

In order to solve the foregoing problem, the present invention constructs a projecting equipment, and the projecting equipment has a projecting apparatus, and the apparatus comprises light emitting diodes and a projecting component, and the apparatus further comprises a switching control valve and a light guide plate;

wherein along a length direction of the light guide plate, the light guide plate has a side connected to the light emitting diodes, and has another side cut into bevel-shaped; the bevel-shaped side has a first reflection layer mounted thereon; the projecting component corresponds to the first reflection layer; a projection direction of the projecting component is perpendicular to the length direction of the light guide plate; the switching control valve is switched between an on position and an off position between the light guide plate and the projecting component;

wherein when the switching control valve is in the on position, the first projection layer reflects lights of the light guide plate into the projecting component as a light source of the projecting component;

when in the off position, the switching control valve cuts off the lights reflected from the first reflection layer to the projecting component, and thereby cuts off the light source of the projecting component.

In the projecting equipment of the present invention, the light guide plate further has a shorter side adjacent to the bevel-shaped side; the shorter side is perpendicular to the length direction of the light guide plate;

Wherein the shorter side has a second reflection layer mounted thereon, and the second reflection layer reflects the lights from the light guide plate back to the light guide plate.

In the projecting equipment of the present invention, an axis is mounted between light guide plate and the projecting component; the switching control valve is rotationally to the axis and switched between an on position and an off position between the light guide plate and the projecting component via the axis.

Compared with the conventional technology, the present invention solves the problem of requiring a computer to control a projector, which leads to complicated operation and high cost in the conventional technology, and simplifies the operation process.

In order to make the contents of the present invention to be easily understood, below, the preferred embodiments of the present invention are described in detail in cooperation with accompanying drawings as follows:

DETAILED DESCRIPTION OF THE PREFERRED EMBODIMENTS

Following description of each embodiment is referring to the accompanying drawings so as to illustrate practicable specific embodiments in accordance with the present invention.

Figure 1:
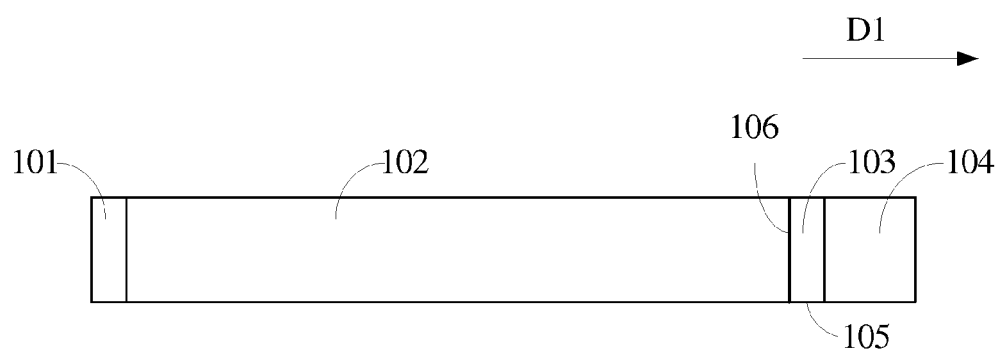
FIG. 1 is a schematic structural view of a first preferred embodiment of a projecting apparatus in accordance with the present invention.

With reference to FIG. 1, FIG. 1 is a schematic structural view of a first preferred embodiment of a projecting apparatus in accordance with the present invention.

In the embodiment shown in FIG. 1, the projecting apparatus comprises light emitting diodes 101, a light guide plate 102, a switching control valve 103 and a projecting component 104.

Figure 2:
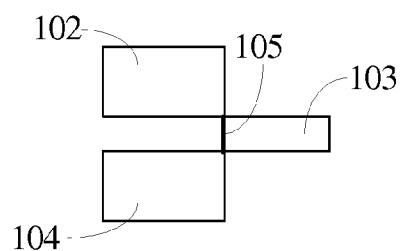
FIG. 2 is a side view of switching the connection of a switching control valve in accordance with the present invention.

Wherein, the light guide plate 102 is mounted between the light emitting diodes 101 and the projecting component 104. An axis mounted between the light guide plate 102 and the projecting component 104. The switching control valve 103 is rotationally connected to the axis 105, which means the switch control valve can pivot around the axis 105, as shown in FIG. 2.

In the embodiment shown in FIG. 1, the switching control valve 103 is switched between an on position and an off position between the light guide plate 102 and the projecting component 104 via the axis 105:

When the switching control valve 103 is in the on position, lights of the light guide plate 102 are guided into the projecting component 104 so as to be a light source of the projecting component;

In the embodiment shown in FIG. 1, in the on position, the switching control valve 103 is rotated outwardly between the light guide plate 102 and the projecting component 104 such that the lights of the light guide plate 102 can be guided into the projecting component 104.

When in the off position, the switching control valve 103 cuts off the lights guided from the light guide plate 102 to the projecting component 104, and thereby cut off the light source of the projecting component 104.

In the embodiment shown in FIG. 1, in the off position, the switching control valve 103 is rotated inwardly between the light guide plate 102 and the projecting component 104 such that the lights of the light guide plate 102 cannot be guided into the projecting component 104.

In this embodiment, the switching control valve 103 is a rotational valve structure. Of course, the switching control valve 103 can be implemented as other types of structure, such as an opaque strip being directly inserted into or pull out between the light guide plate 102 and the projecting component 104, which is able to control whether to guide the lights of the light guide plate 102 into the projecting component 104 or not, and will not be enumerated herein.

Wherein, the projecting component 104 is configured to achieve projection and may include lenses, a focal-distance regulator and other devices, and will not be enumerated herein.

With reference to FIG. 1, the switching control valve 103 has a reflection layer 106 mounted on a side thereof that the light guide plate is connected to.

In the embodiment shown in FIG. 1, a length direction of the light guide plate and a projection direction D1 of the projecting component are parallel.

The operation theory of the projecting apparatus of the embodiment is described as follows in cooperation with FIG. 1.

When proceeding to project, the switching control valve 103 is switched to the on position between the light guide plate 102 and the projecting component 104, which means that the switching control valve 103 is rotated outwardly between the light guide plate 102 and the projecting component 104. Meanwhile, the light guide plate 102 guides the lights emitted by the light emitting diodes 101 to the projecting component 104, and the projecting component 104 then may use the lights guided by the light guide plate 102 as the light source for projection.

When disabling the projection function, the switching control valve 103 is switched to the off position between the light guide plate 102 and the projecting component 104, which means that the switching control valve 103 is rotated inwardly between the light guide plate 102 and the projecting component 104. Meanwhile, the switching control valve 103 cuts off the lights guided from the light guide plate 102 to the projecting component 104, and then further to cut off the light source of the projecting component 104. And the projecting component 104 then is unable to project.

Wherein, while switching the switching control valve 103 to the off position between the light guide plate 102 and the projecting component 104, the reflection layer 106 reflects the lights of the light guide plate 102 back to the light guide plate 102.

In the embodiment shown in FIG. 1, the switching control valve 103 is used to control the lights of the light guide plate 102 whether to be guided into the projecting component 104, wherein when enabling the projection function, the switching control valve 103 is used to control the lights of the light guide plate 102 to be guided into the projecting component 104, and the projecting component 104 then may use the lights of the light guide plate 102 as the light source to proceed to project; when disabling the projection function, the switching control valve 103 is used to block the lights of the light guide plate 102 to be guided into the projecting component 104. And the projecting component 104 is unable to project. Not only the operation is simple, but also saves cost and will advantage the popularization of projecting equipments.

The present invention further provides projecting equipment, and the projecting equipment includes the projecting apparatus shown in FIG. 1. The apparatus has been described in detail in the foregoing description, and no more tautology here.

Figure 3:
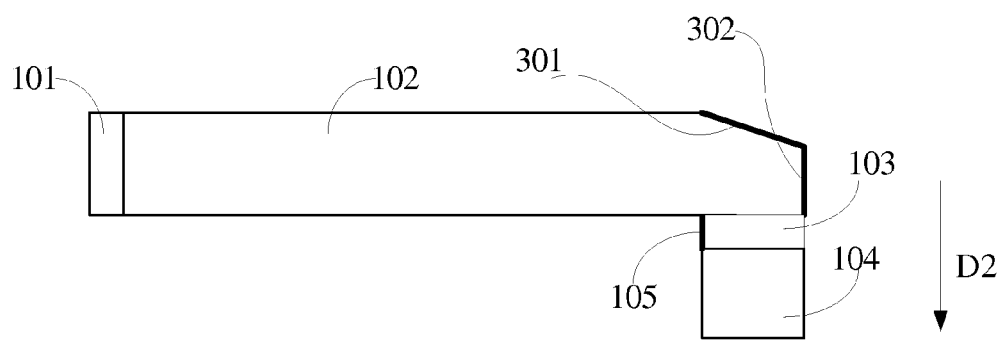
FIG. 3 is a schematic structural view of the second preferred embodiment of a projecting apparatus in accordance with the present invention.

With reference to FIG. 3, FIG. 3 depicts a schematic structural view of a second preferred embodiment of the projecting apparatus in accordance with the present invention.

In the embodiment shown in FIG. 3, the projecting apparatus comprises light emitting diodes 101, a light guide plate 102, a switching control valve 103 and a projecting component 104.

With reference to FIG. 3, along a length direction of the light guide plate 102, the light guide plate 102 has a side connected to the light emitting diodes 101, and has another side cut into bevel-shaped. The bevel-shaped side has a first reflection layer 301 mounted thereon. The projecting component 104 corresponds to the first reflection layer 301, and a projection direction D2 of the projecting component 104 is mounted perpendicularly to the length direction of the light guide plate 102.

With reference to FIG. 3, an axis mounted between the light guide plate 102 and the projecting component 104. The switching control valve 103 is rotationally connected to the axis 105, which means the switch control valve can pivot around the axis 105, as shown in FIG. 2.

In the embodiment shown in FIG. 3, the switching control valve 103 is switched between an on position and an off position between the light guide plate 102 and the projecting component 104 via the axis 105:

When the switching control valve 103 is in the on position, the first reflection layer 301 guides the lights of the light guide plate 102 into the projecting component 104 as a light source of the projecting component;

In the embodiment shown in FIG. 3, in the on position, the switching control valve 103 is rotated outwardly between the light guide plate 102 and the projecting component 104 such that the first reflection layer 301 can reflect the lights of the light guide plate 102 to the projecting component 104.

When in the off position, the switching control valve 103 cuts off the lights guided from the light guide plate 102 to the projecting component 104, and thereby cuts off the light source of the projecting component 104.

In the embodiment shown in FIG. 3, in the off position, the switching control valve 103 is rotated inwardly between the light guide plate 102 and the projecting component 104 such that the first reflection layer 301 is unable to reflect the lights of the light guide plate 102 to the projecting component 104.

In this embodiment, the switching control valve 103 is a rotational valve structure. Of course, the switching control valve 103 can be implemented as other types of structure, such as an opaque strip being directly inserted into or pull out between the light guide plate 102 and the projecting component 104, which is able to control whether to guide the lights of the light guide plate 102 into the projecting component 104 or not, and will not be enumerated herein.

With reference to FIG. 3, the light guide plate 102 further has a shorter side adjacent to the bevel-shaped side, and the shorter side is perpendicular to the length direction of the light guide plate 102. The shorter side has a second reflection layer 302 mounted thereon. The second reflection layer 302 reflects the lights from the light guide plate 102 back to the light guide plate 102.

Wherein, the projecting component 104 is configured to achieve projection and may include lenses, a focal-distance regulator and other devices, and will not be enumerated herein.

The operation theory of the projecting apparatus of the embodiment is described as follows in cooperation with FIG. 3.

When enabling the projection function, the switching control valve 103 is switched to the on position between the light guide plate 102 and the projecting component 104, which means that the switching control valve 103 is rotated outwardly between the light guide plate 102 and the projecting component 104. Meanwhile, the first reflection layer 301 reflects the lights guided in by the light guide plate 102 to the projecting component 104. And the projecting component 104 then may use the lights reflected by the first reflection layer 301 as the light source for projection.

When disabling the projection function, the switching control valve 103 is switched to the off position between the light guide plate 102 and the projecting component 104, which means that the switching control valve 103 is rotated inwardly between the light guide plate 102 and the projecting component 104. Meanwhile, the switching control valve 102 cuts off the lights reflected from the first reflection layer 301 to the projecting component 104, and then further to cut off the light source of the projecting component 104. And the projecting component 104 then is unable to project.

In the embodiment shown in FIG. 3, the switching control valve 103 is used to control the lights of the light guide plate 102 whether to be guided into the projecting component 104, wherein when enabling the projection function, the switching control valve 103 is used to control the first reflection layer 301 to reflect the lights guided by the light guide plate 102 to the projecting component 104, and the projecting component 104 then may use the lights reflected by first reflection layer 301 as the light source to proceed to project; when disabling the projection function, the switching control valve 103 is used to block the lights of the first reflection layer 301 to be reflected into the projecting component 104. And the projecting component 104 is unable to project. Not only the operation is simple, but also saves cost and will advantage the popularization of projecting equipments.

The present invention further provides projecting equipment, and the projecting equipment includes the projecting apparatus shown in FIG. 3. The apparatus has been described in detail in the foregoing description, and no more tautology here.

In conclusion, although the present invention has been described with reference to embodiments thereof, these embodiments merely illustrate concrete examples, not restrict the present invention. And it is understood that many changes and modifications to the described embodiment can be carried out without departing from the scope and the spirit of the invention that is intended to be limited only by the appended claims.

What is claimed:

1. A projecting apparatus, comprising light emitting diodes, a light guide plate and a projecting component, wherein the light guide plate is mounted between the light emitting diodes and the projecting component, characterized in that:
    a switching control valve is mounted between the light guide plate and the projecting component, and the switching control valve is switched between an on position and an off position between the light guide plate and the projecting component;
    wherein when the switching control valve is in the on position, lights of the light guide plate is guided to the projecting component as a light source of the projecting component;
    when in the off position, the switching control valve cuts off the lights guided from the light guide plate to the projecting component, and thereby cuts off the light source of the projecting components;
    wherein the switching control valve has a reflection layer mounted on a side thereof to which the light guide plate is connected; and while the switching control valve is switched to the off position, the reflection layer reflects the lights of the light guide plate back to the light guide plate.

2. The projecting apparatus as claimed in claim 1, characterized in that: an axis is mounted between the light guide plate and the projecting component, and the switching control valve is rotationally connected to the axis and switched between the on position and the off position between the light guide plate and the projecting component.

3. The projecting apparatus as claimed in claim 1, characterized in that: a length direction of the light guide plate and a projection direction of the projecting component are parallel.

4. A projecting apparatus, comprising light emitting diodes and a projecting component, characterized in that: the apparatus further comprises a switching control valve and a light guide plate;
    wherein along a length direction of the light guide plate, the light guide plate has a side connected to the light emitting diodes, and has another side cut into bevel-shaped; the bevel-shaped side has a first reflection layer mounted thereon; the projecting component corresponds to the first reflection layer; a projection direction of the projecting component is perpendicular to the length direction of the light guide plate; the switching control valve is switched between an on position and an off position between the light guide plate and the projecting component;
    wherein when the switching control valve is in the on position, the first projection layer reflects lights of the light guide plate into the projecting component as a light source of the projecting component;
    when in the off position, the switching control valve cuts off the lights reflected from the first reflection layer to the projecting component, and thereby cuts off the light source of the projecting component.

5. The projecting apparatus as claimed in claim 4, characterized in that: the light guide plate further has a shorter side adjacent to the bevel-shaped side; the shorter side is perpendicular to the length direction of the light guide plate;
    Wherein the shorter side has a second reflection layer mounted thereon, and the second reflection layer reflects the lights from the light guide plate back to the light guide plate.

6. The projecting apparatus as claimed in claim 4, characterized in that: an axis is mounted between light guide plate and the projecting component; the switching control valve is rotationally to the axis and switched between an on position and an off position between the light guide plate and the projecting component via the axis.

* * * * *